(12) United States Patent
Overend et al.

(10) Patent No.: US 10,947,969 B2
(45) Date of Patent: Mar. 16, 2021

(54) POLYMERIC MATERIALS

(71) Applicant: COLORMATRIX HOLDINGS, INC., Wilmington, DE (US)

(72) Inventors: Andrew Overend, Westhoughton (GB); Ian Campbell, Liverpool (GB); Brian Jones, Merseyside (GB)

(73) Assignee: ColorMatrix Europe Limited, Knowsley (GB)

( * ) Notice: Subject to any disclaimer, the term of this patent is extended or adjusted under 35 U.S.C. 154(b) by 126 days.

(21) Appl. No.: 14/980,724

(22) PCT Filed: Jun. 26, 2014

(86) PCT No.: PCT/GB2014/051956
§ 371 (c)(1),
(2) Date: Dec. 28, 2015

(87) PCT Pub. No.: WO2014/207472
PCT Pub. Date: Dec. 31, 2014

(65) Prior Publication Data
US 2016/0290334 A1 Oct. 6, 2016

(30) Foreign Application Priority Data

Jun. 28, 2013 (GB) ................................ 1311664
Jun. 28, 2013 (GB) ................................ 1311666

(51) Int. Cl.
*B29B 7/94* (2006.01)
*F04C 2/10* (2006.01)
(Continued)

(52) U.S. Cl.
CPC ............ *F04C 2/10* (2013.01); *F04B 23/12* (2013.01); *F04C 2/084* (2013.01); *F04C 2/18* (2013.01);
(Continued)

(58) Field of Classification Search
CPC ...................................................... B29B 7/94
(Continued)

(56) References Cited

U.S. PATENT DOCUMENTS 2,837,102 A * 6/1958 Bauer .................. B01F 15/0412
137/7
3,048,030 A * 8/1962 De Haven .............. G01N 11/08
73/54.11
(Continued)

FOREIGN PATENT DOCUMENTS

| CN | 101693175 B | 11/2011 |
| GB | 1095015 | 12/1967 |

(Continued)

*Primary Examiner* — David L Sorkin
(74) *Attorney, Agent, or Firm* — Fay Sharpe LLP

(57) ABSTRACT

High pressure injection apparatus (2) for addition of a liquid formulation into a melt stream comprises a first pump which is arranged to accurately meter the liquid formulation (including highly loaded formulations comprising solids comprising particles of relatively large size) and a second pump which boosts the pressure of the formulation to that of the melt stream into which it is to be injected. In an embodiment, the apparatus includes a tank (4) for initially receiving liquid formulation. The tank is subjected to ambient temperature and pressure and need not be stirred or otherwise agitated. The tank is arranged to deliver the formulation via pipe (6) into a first pump (8) (which may be a diaphragm pump or a progressing cavity pump). The pump is arranged to work at a pressure up to 120 bar to boost pressure. Downstream of pump (8), a pipe (10) is arranged to deliver formulation from the pump (8) to a gear pump (12), driven by a motor (13). The gear pump acts to meter the liquid formulation. In an alternative embodiment, apparatus may include a progressing cavity pump to meter formulation and (Continued)

a gear pump to increase pressure. The apparatus may be used to inject a fluid formulation into a melted polymeric material.

20 Claims, 10 Drawing Sheets

(51) Int. Cl.
*F04C 11/00* (2006.01)
*F04C 2/18* (2006.01)
*F04C 2/08* (2006.01)
*F04B 23/12* (2006.01)
*F04C 2/107* (2006.01)

(52) U.S. Cl.
CPC ............. *F04C 11/005* (2013.01); *B29B 7/94* (2013.01); *F04C 2/1071* (2013.01); *F04C 2220/24* (2013.01); *F04C 2230/602* (2013.01)

(58) Field of Classification Search
USPC .............................................. 366/182.2, 272
See application file for complete search history.

(56) References Cited

U.S. PATENT DOCUMENTS

| | | | | |
|---|---|---|---|---|
| 3,252,320 A * | 5/1966 | Welty | ............... | G01N 11/08 |
| | | | | 264/40.6 |
| 3,838,949 A * | 10/1974 | Makino | ............... | F04C 2/1073 |
| | | | | 418/48 |
| 4,478,102 A * | 10/1984 | Ackermann | ............. | C21C 5/50 |
| | | | | 266/245 |
| 5,417,239 A | 5/1995 | Ford | | |
| 5,820,354 A * | 10/1998 | Wild | ................. | F04C 2/1071 |
| | | | | 417/244 |
| 6,268,672 B1 * | 7/2001 | Straub | ................. | E21B 43/128 |
| | | | | 166/105 |
| 6,457,958 B1 * | 10/2002 | Dunn | ................. | F04C 2/1071 |
| | | | | 418/1 |
| 7,278,776 B2 * | 10/2007 | Helbing | ................. | B29B 7/94 |
| | | | | 137/565.3 |
| 2002/0049298 A1 * | 4/2002 | Pross | ................... | B01J 2/02 |
| | | | | 528/83 |
| 2004/0126257 A1 * | 7/2004 | Lemay | ............... | F04C 2/1075 |
| | | | | 418/48 |
| 2004/0147655 A1 * | 7/2004 | Sawaki | ............... | C08G 64/406 |
| | | | | 524/425 |
| 2009/0110565 A1 * | 4/2009 | Parrett | ............... | F01C 21/007 |
| | | | | 417/203 |
| 2009/0110579 A1 * | 4/2009 | Amburgey | ............ | F04C 2/1075 |
| | | | | 418/48 |
| 2011/0014558 A1 * | 1/2011 | Ikuta | ................... | G03G 9/0806 |
| | | | | 430/108.1 |
| 2012/0024181 A1 * | 2/2012 | Von Lengeling | ......... | F42D 1/10 |
| | | | | 102/311 |
| 2012/0108735 A1 * | 5/2012 | Kluge | ................... | B29B 7/38 |
| | | | | 524/560 |
| 2012/0141932 A1 * | 6/2012 | Yamauchi | ............ | G03G 9/0804 |
| | | | | 430/109.3 |
| 2012/0282545 A1 * | 11/2012 | Kabai | ................. | G03G 9/0806 |
| | | | | 430/137.14 |
| 2014/0073006 A1 * | 3/2014 | Zar | ..................... | C12N 5/0676 |
| | | | | 435/69.1 |

FOREIGN PATENT DOCUMENTS

GB 1311162 3/1973
WO 2012093370 A1 7/2012

* cited by examiner

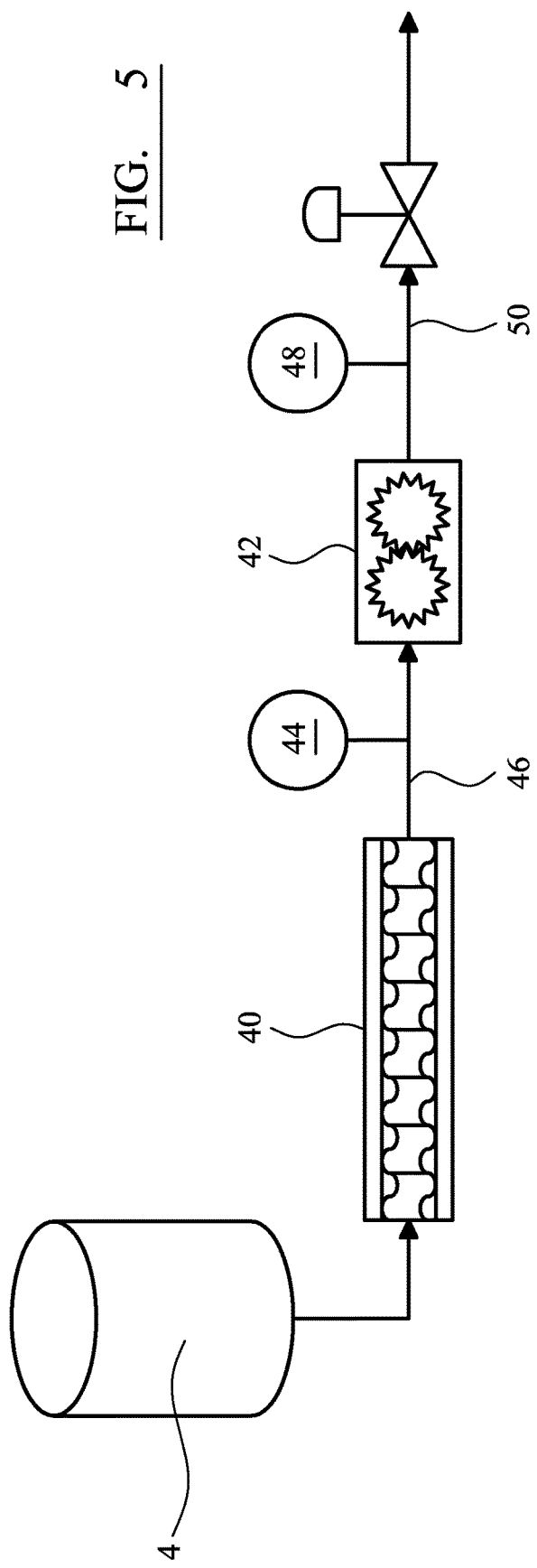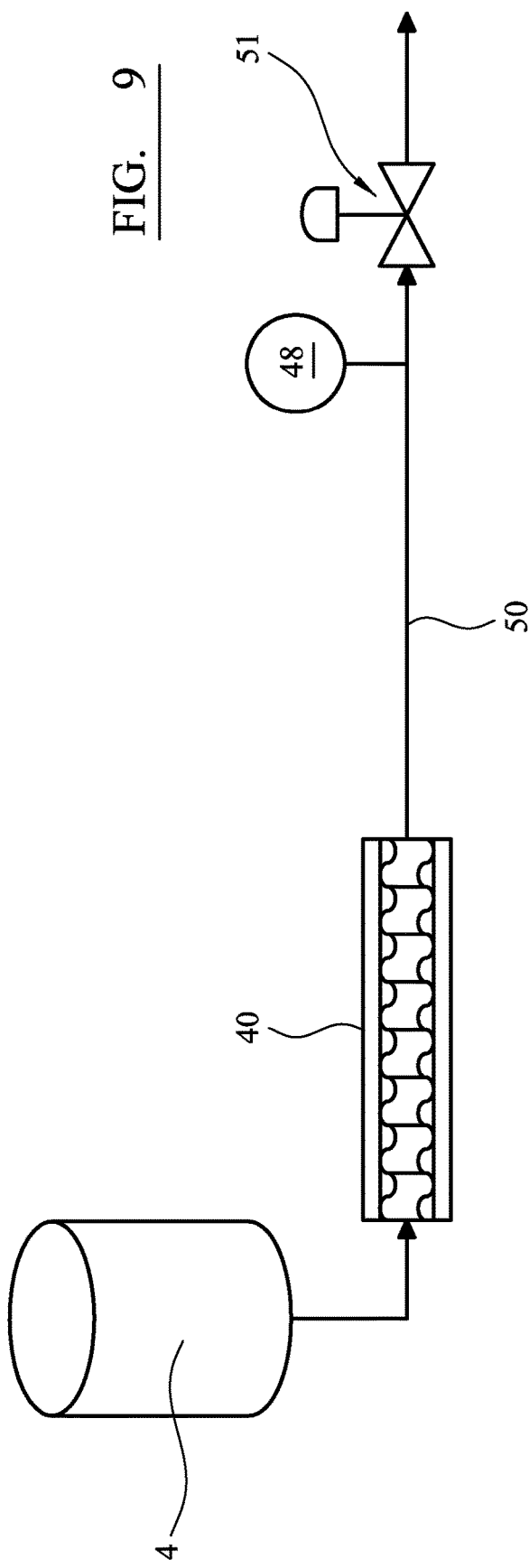

POLYMERIC MATERIALS

This invention relates to polymeric materials and particularly, although not exclusively, relates to incorporation of additives into polymeric materials, for example polyesters, such as in polyester fibre production.

It is known to incorporate additives, (e.g. colorants, stabilizers, delusterants, anti-static agents, optical brighteners, processing aids etc.) into fibres post-production by bath dyeing or spin dyeing. However disadvantageously, this requires large volumes of liquid additive formulations to enable the additive to permeate into the fibre; the process can be time-consuming; and the fibre must be dried following the permeation process.

It is also known to use a masterbatch containing additives to introduce the additives into a polymer. For example pellets of the masterbatch and pellets of the polymer may be introduced into an extruder via its feedthroat and the two components melt-processed together. Disadvantageously, however, cleaning of the extruder is time-consuming, since the entire length of the extruder needs cleaning between, for example colour changes; and dosing and handleability of solid pelletized masterbatch can be challenging. In addition, some properties of materials, for example spun fibre, made using masterbatches, may be detrimentally affected.

A preferred method of incorporating additives is incorporation of a liquid formulation into a polymer melt. The formulation suitably includes a vehicle in which the additive is dispersed prior to injection into the melt.

U.S. Pat. No. 7,278,776 (Saurer) discloses an apparatus and method for injecting a liquid dye into a polymer melt and addresses the problem of obtaining, over time, a uniform and constant colouration of the polymer melt by supplying to the polymer melt an exact quantity of the liquid dye. The problem is solved by provision of apparatus for injecting a dye which includes a tank for containing a liquid dye, wherein the tank is connected to a source of gas pressure so as to generate a gas cushion which acts upon the dye in the tank so the dye is delivered to an inlet of a feed pump under constant pressure. The feed pump, which is a gear pump, is connected to a dye feed line between the tank and an inlet of a metering pump which is also a gear pump. The metering pump has an inlet connected to the tank via the dye feed line and an outlet for connection to a melt carrying component, wherein the metering pump is configured to add measured quantities of dye from the tank to a polymer melt in the melt carrying component, for example an extruder.

Although the apparatus of U.S. Pat. No. 7,278,776 may be able to satisfactorily deliver liquid dyes which comprise stable relatively low viscosity formulations, it is not usable to accurately dose, over a long period of time, a range of formulation types, including relatively viscous formulations (e.g. having a viscosity of up to 40,000cP,) and/or formulations which include high loadings of particulates (e.g. up to 85 wt % solids), wherein the particulates may have particle sizes greater than 5 μm and up to 150 μm. In particular, for the gear pumps of U.S. Pat. No. 7,278,776 to accurately dose the liquid dyes, the clearances within the pumps need to be fairly narrow which tends to make the pumps more susceptible to wear and/or make it difficult for the pumps to handle relatively viscous formulations and/or formulations which have relatively high loadings of particulates.

It is an object of the present invention to address the above described problems.

According to a first aspect of the invention, there is provided apparatus for injecting a fluid formulation into a melted polymeric material, the apparatus comprising a first pump and a gear pump arranged in series in a fluid path between a reservoir for the fluid formulation to be injected and an outlet of the apparatus.

Said first pump may be a progressing cavity pump (pcp) or a diaphragm pump, for example a multiple diaphragm pump. It is preferably a pcp.

The first pump is preferably provided upstream of the gear pump. Said reservoir is suitably upstream of the first pump with the reservoir being directly connected to the first pump via a first pipe. The first pipe preferably provides an uninterrupted fluid connection between reservoir and first pump. A second pipe suitably extends between the first pump and gear pump for passage of fluid formulation from the first pump to the gear pump.

The reservoir is preferably arranged to deliver fluid formulation to the inlet of the first pump at a pressure of less than 100 millibar. Said reservoir is preferably open to the atmosphere. Advantageously, it is preferably not pressurized. Suitably, the apparatus is arranged such that the pressure at the inlet of the first pump is defined by the static head of fluid in the reservoir and atmospheric pressure and no additional means is provided for pressurizing the reservoir. Preferably, the reservoir and first pump are arranged for flooded suction of the first pump, with fluid from the reservoir—i.e. fluid from the reservoir is effectively "poured" into the first pump.

The reservoir may have a volume in the range 1 to 1000 litres, preferably of at least 10 litres.

A pipe extending between the reservoir and first pump may have an inside diameter in the range 4 to 20 mm. In one embodiment, the reservoir may comprise an IBC and the first pump is screwed into the outlet of the IBC.

The reservoir may contain a fluid formulation having any feature of the fluid formulation hereinafter described.

Said first pump is preferably arranged to urge fluid formulation into an inlet of the gear pump.

Said gear pump is suitably an external gear pump. Such a gear pump is relatively cheap to purchase and simple to operate. It can also be relatively easily cleaned. Said gear pump suitably has gears with spur teeth. Advantageously, the gear pump can have relatively wide tolerances which enable it to pump a relatively viscous fluid formulation which is relatively highly loaded with particulate material and/or wherein the particulate material in the fluid formulation has relatively large particle sizes.

Said gear pump is preferably arranged to deliver fluid at a rate of in the range 0.2 to 10 ml per revolution, preferably in the range 0.5 to 5 ml per revolution Said gear pump suitably includes a gear having gear teeth which include gear tips, wherein the minimum distance between the gear tips and the adjacent housing (referred to herein as the "gear tip-housing clearance") is at least 0.005 mm, suitably at least 0.010 mm. Said gear tip-housing clearance may be less than 0.200 mm, preferably less than 0.150 mm, more preferably less than 0.100 mm.

Suitably, said gear pump includes two meshing gears, wherein both gears include gear tip-housing clearances as described.

Said gear pump suitably includes a gear, wherein the sum of the minimum distances between gear faces and the adjacent bearing faces measured parallel to the axis of rotation of the gear (referred to herein as the "gear faces-bearing faces clearances) is at least 0.005 mm, suitably at least 0.010 mm. Said gear faces-bearing faces clearances may be less than 0.200 mm, preferably less than 0.150 mm, more preferably less than 0.100 mm.

The intermeshing clearance between intermeshing gears may be at least 0.005 mm, suitably at least 0.010 mm. It may be less than 0.200 mm, preferably less than 0.150 mm, more preferably less than 0.100 mm.

Suitably, said gear pump includes two meshing gears, wherein both gears include gear faces-bearing faces clearances as described.

The inlet to the gear pump suitably has an inside diameter of less than 10 mm; it may be at least 1 mm.

Said gear pump may be arranged to deliver at least 0.1 $cm^3$/revolution, preferably at least 1.0 $cm^3$/revolution. It may be arranged to deliver less than 10 $cm^3$/revolution, less than 8 $cm^3$/revolution or less than 6 $cm^3$/revolution. Said gear pump may be operable at an rpm in the range 5-200 rpm, for example in the range 10-150 rpm, suitably when delivering at the rates indicated.

A conduit between the first pump and gear pump may have an inside diameter of less than 25 mm; it may be at least 1 mm.

Preferably, said apparatus includes a first pressure sensor upstream of the gear pump. The first pressure sensor is preferably arranged to measure pressure of fluid formulation immediately upstream of the gear pump. Pressure information from the first pressure sensor may be communicated to a processing unit.

Preferably, said apparatus includes a second pressure sensor downstream of the gear pump. The second pressure sensor is preferably arranged to measure pressure of fluid formulation immediately downstream of the gear pump. Pressure information from the second pressure sensor may be communicated to said processing unit.

The apparatus may be arranged to control said first pump, for example the speed thereof, in dependence upon the pressures assessed by said first and second pressure sensors.

Said first pump and said gear pump are preferably independently operable. Preferably, the speed of the first pump can be adjusted independently of the speed of the gear pump; and preferably the speed of the gear pump can be adjusted independently of the speed of the first pump.

Said apparatus preferably includes only one first pump (eg pcp or diaphragm pump).

Said apparatus preferably includes only one gear pump. Between said reservoir and said outlet of the apparatus via which outlet fluid formulation is suitably delivered into a melted polymeric material, said apparatus preferably includes only two pumps—said first pump and said gear pump.

Said outlet of said apparatus may suitably be for connection to a melt processing apparatus, suitably so the fluid formulation can be introduced, for example injected, into a melt stream produced by said melt processing apparatus. Said apparatus may include a valve, downstream of the gear pump, for controlling flow of fluid formulation into the melt stream. The valve may be controlled by a processing unit, for example said processing unit which receives information from said first and second pressure sensors.

Preferably, said apparatus for injecting is provided in combination with a melt processing apparatus, suitably to define an assembly, wherein said outlet of the apparatus for injecting is in fluid communication with an inlet via which fluid formulation can be introduced into a melt stream produced by said melt processing apparatus.

Said apparatus is preferably arranged to inject fluid formulation at a pressure of at least 10 bar (preferably at least 30 bar) into the melt stream. The pressure of injection may be less than 300 bar.

In the combination comprising apparatus for injecting and said melt processing apparatus, pressure monitoring means is suitably provided for monitoring the pressure of the melt stream, suitably adjacent the position of injection of fluid formulation into the melt stream, wherein information relating to said pressure is suitably arranged to be communicated to said apparatus for injecting, for example to a or said processing unit thereof. The apparatus for injecting may be arranged to adjust the pressure at which fluid formulation is injected into the melt stream in dependence upon the pressure of said melt stream as assessed by said pressure monitoring means. Thus, the apparatus for injecting, for example a or said processing unit thereof, may receive periodic feedback on the pressure of the melt stream and the apparatus, for example a or said processing unit, is suitably programmed to adjust the pressure of injection accordingly.

A or said processing unit of said apparatus for injecting is suitably arranged to operate said gear pump so that the pressure difference between the inlet and outlet of the gear pump is less than 8 bar, for example less than 5 bar or less than 3 bar. In this case, the gear pump may be arranged not to significantly increase the pressure of the fluid formulation in use. The primary function of the gear pump (herein referred to as the metering pump) may be to meter formulation. The first pump (herein referred to as the pressure-increasing pump) may be operated, suitably under control of said processing unit, to significantly increase pressure of the fluid formulation in use. Thus, in this case, the processing unit of said apparatus is suitably arranged to operate said pressure-increasing pump so that the pressure difference between its inlet and outlet is greater than 20 or 60 bar. The processing unit may also control metering by the metering pump.

In an embodiment which includes a pcp and gear pump, a or said processing unit of said apparatus for injecting is suitably arranged to operate one of either the pcp or gear pump so that the pressure difference between the inlet and outlet of the selected one of either the pcp or gear pump is less than 8 bar, for example less than 5 bar or less than 3 bar. In this case, the selected pump may be arranged not to significantly increase the pressure of the fluid formulation in use. The primary function of the selected pump (herein referred to as the metering pump) may be to meter formulation. The other one of either the pcp or gear pump (herein referred to as the pressure-increasing pump) may be operated, suitably under control of said processing unit, to significantly increase pressure of the fluid formulation in use. Thus, in this case, the processing unit of said apparatus is suitably arranged to operate said pressure-increasing pump so that the pressure difference between its inlet and outlet is greater than 5 bar, 20 bar, 50 bar, 100 bar or 150 bar. The processing unit may also control metering by the metering pump.

In each embodiment, said apparatus for the injection may be arranged to deliver fluid formulation into melted polymeric material at a rate in the range 1 ml/minute to 1500 ml/minute, preferably in the range 3 ml/minute to 750 ml/minute, more preferably in the range 10 ml/minute to 500 ml/minute.

In a first embodiment, said apparatus may be arranged so the gear pump is operable to meter the fluid formulation and said first pump is arranged to increase the pressure of the fluid formulation. A processing unit of the apparatus may be programmed to operate the gear pump and first pump as aforesaid.

Said first pump may be arranged to increase the pressure of the fluid formulation to at least 60 bar, preferably at least 80 bar, more preferably at least 100 bar. The first pump may be arranged to increase pressure to a maximum of less than 150 bar or 120 bar. The pressure of fluid formulation at the inlet of the first pump may be relatively low (e.g. less than 5 bar), in use. Thus, the first pump is suitably of a type which is arranged to increase the pressure of the fluid formulation by at least 60 bar, preferably by at least 80 bar and, more preferably, by at least 100 bar.

Said first pump may be arranged to deliver fluid formulation at a rate of at least 0.10 ml/revolution, preferably at a rate of at least 0.15 ml/revolution, more preferably at a rate of at least 0.20 ml/revolution and, suitably, at the same time, at pressures as described. The maximum rate of delivery of fluid formulation may be less than 10 ml/revolution, less than 8 ml/revolution or less than 5 ml/revolution. The first pump is suitably arranged to deliver fluid formulation at the aforementioned rate and at the aforementioned pressures described.

When in said first embodiment the first pump is a pcp, said pcp may be operable at speeds up to 600 rpm. Said pcp may include up to 40 or up to 36 stages (i.e. full cavities). It may include at least 10, 15 or 20 stages, suitably to enable it to generate the requisite pressure.

In the first embodiment (and in a second embodiment described hereinafter), the gear pump may be as described generally above. In the first embodiment, however, a processing unit of the apparatus is suitably programmed to operate the gear pump so the gear pump meters the fluid formulation for delivery to a melt stream as described. In this case, the processing unit may be programmed to maintain the $\Delta P$ between the inlet and outlet of the gear pump at substantially zero. Thus, the difference in pressure between the inlet and outlet of the gear pump may be less than 3 bar, 2 bar or 1 bar. Preferably, the processing unit is programmed to maintain a difference in pressure across the gear pump at ±1 bar during injection of fluid formulation into melted polymeric material.

The apparatus suitably includes a user interface for inputting a desired dose rate at which the fluid formulation is to be delivered into the melted polymeric material. The user interface suitably communicates with the processing unit described and, preferably, the processing unit controls the rate of operation of the gear pump according to the desired dose rate and/or so that predetermined amounts of fluid formulation are accurately metered, in use, by the gear pump for delivery of the fluid formulation into melted polymeric material.

In a second embodiment, wherein said first pump is a pcp, said apparatus may be arranged so the pcp is operable to meter the fluid formulation and said gear pump is arranged to increase the pressure of the fluid formulation.

In the second embodiment, said pcp advantageously can be cheaper and smaller than that used in accordance with the first embodiment. Said pcp may be arranged only to generate up to 5 bar (and may suitably be inherently incapable of generating a greater pressure than this). Said pcp may include 10 stages or fewer, preferably 7 stages or fewer, more preferably 4 stages or fewer. It may include at least 2 stages. Said pcp may be arranged to deliver formulation at a rate in the range 0.1 ml/rev to 10 ml/rev.

Although it is preferred in both the first and second embodiments for the apparatus to include only one gear pump, the apparatus could include two or more gear pumps, in series, particularly if it is desired to generate higher pressure, for example up to 300 bar.

As described, the apparatus of the first aspect suitably includes a processing unit for controlling and/or monitoring the first pump and gear pump. The processing unit is suitably arranged to receive information from first and second pressure sensors described above, for example sensors positioned to monitor pressure at the inlet and outlet of the gear pump. Said processing unit may be arranged to receive information from the melt processing apparatus with which the apparatus for injecting is suitably associated. For example, information on pressure of the melt stream is suitably communicated to the processing unit. Information on the flow rate of the melt stream may also be communicated to the processing unit. Information on the state of the valve downstream of the gear pump may be communicated to the processing unit.

The apparatus of the first aspect suitably includes a user interface by means of which a user may input process information. For example, one or more of the following may be input by a user: melt processing apparatus throughput, injection point pressure and LDR (Let-Down-Ratio).

In view of the relatively low cost nature of gear pumps for use in accordance with the first aspect, a plurality of (e.g. at least 3 or at least 4) identical pumps may be provided and arranged to be interchangeable parts of the apparatus. For example, the pumps may not need to be cleaned between uses so each pump in the plurality may comprise a different fluid formulation for example a different colour.

In the second embodiment described, both the pcp and gear pump may be relatively low cost. In this case, the apparatus may comprise a plurality (e.g. at least 3 or at least 4) colour change units, each of which may comprise a pcp, gear pump and associated pipework. A colour-change unit may also include a reservoir for the fluid formulation. The colour change units may be interchangeable parts of the apparatus. They may be contaminated with different fluid formulations, for example colours; but suitably do not need to be extensively cleaned (e.g. to remove all traces of colour) between use in the apparatus.

According to a second aspect of the invention, there is provided a method of injecting a fluid formulation into a melted polymeric material, the method comprising: selecting an apparatus comprising a first pump and a gear pump arranged in series in a flow path between a reservoir which contains the fluid formulation to be injected and an outlet; operating the first pump or gear pump to increase the pressure of formulation passing between the reservoir and said outlet; and injecting said formulation into melted polymeric material downstream of said outlet.

Advantageously, the method may be used to dose relatively viscous formulations which have high loadings of relatively large particles.

Unless otherwise stated, viscosity described herein may be measured using a Brookfield Viscometer at 20 rpm and 23° C.

Said formulation may have a viscosity of at least 5000 cP, suitably at least 10000 cP, preferably at least 15000 cP. The viscosity may be less than 45,000 cP, preferably less than 40,000 cP, more preferably less than 35,000 cP.

Said fluid formulation may include at least 20 wt %, suitably at least 30 wt %, preferably at least 40 wt %, more preferably at least 50 wt %, especially at least 60 wt %, solids. Said solids may comprise particulate material, for example solid pigments and/or dyes. Said fluid formulation may include 85 wt % or less of solids of the type described. Said fluid formulation suitably includes 15 to 70 wt %, preferably 15 to 50 wt % of fluid, for example liquid. Said solids are suitably provided as a dispersion in a fluid which is suitably a vehicle. Thus, the solids may be generally insoluble in the vehicle. The ability to use highly loaded formulations (and consequently relatively low vehicle levels) may be advantageous in minimizing any detrimental effect associated with incorporation of vehicle into the polymeric material.

Said solids may be arranged to adjust a property of a plastics material into which they may be delivered by the apparatus. Said solids may comprise any material that it is desired to introduce into a plastics material and may be selected from colourants, UV filters, oxygen absorbers, antimicrobial agents, acetaldehyde scavengers, reheat additives, antioxidants, light stabilizers, optical brighteners, processing stabilizers and flame retardants. Colourants may comprise pigments or dyes.

Said solids preferably comprise insoluble colourants (i.e. insoluble in the vehicle), for example insoluble pigments or dyes.

Said vehicle is suitably a liquid at STP. Said fluid formulation is preferably a liquid at STP. Said vehicle preferably has a boiling point (at atmospheric pressure of 760 mmHg) of greater than 300° C., preferably greater than 350° C., more preferably greater than 500° C. The boiling point may be less than 1150° C. or less than 1000° C. The melting point of the vehicle may be less than 0° C. or less than −10° C.

Said vehicle is preferably a liquid vehicle. Illustrative liquid vehicles include but are not limited to: mineral oils, $C_9$-$C_{22}$ fatty acid esters, ethoxylated $C_9$-$C_{22}$ fatty acid esters, ethoxylated alcohols and plasticizers. Plasticizers may for example be sebacates and azelates, such as dibutyl sebacate, esters such as benzyl benzoate, adipates such as dioctyladipate, citrates such as triethyl citrate, epoxies, phosphate esters such as 2-ethylhexyl diphenyl phosphate, phthalates such as dioctylphthalate, and secondary plasticisers such as chlorinated paraffins.

The sizes of particles in said fluid formulation may be assessed using optical microscopy. Suitably less than 5%, less than 1% or less than 0.1% of the number of particles in the fluid formulation have a maximum particle size of greater than 150 µm. At least 10% of the number of particles in the fluid formulation may have a maximum particle size greater than 10 µm, or greater than 20 µm or greater than 30 µm or greater than 40 µm.

The fluid formulation may include particles having a 5 µm or greater median particle diameter. The median particle diameter may be 100 µm or less. As used herein, a $d_{50}$ particle size is the median diameter, where 50% of the volume is composed of particles larger than the stated $d_{50}$, and 50% of the volume is composed of particles smaller than the stated $d_{50}$ value.

As used herein, the median particle size is the same as the $d_{50}$ particle size. In the aforementioned the particle sizes and/or median diameter may be assessed by laser diffraction, for example using a Horiba LA950 Laser Particle Size Analyzer.

Said fluid formulation may include at least some particles (e.g. at least 5% of the number of particles, for example at least 10%, and preferably less than 50% of the number or less than 30% of the number) having particle sizes greater than the gear tip-housing clearance of the gear pump, defined as described in the first aspect.

Said fluid formulation may include at least some particles (e.g. at least 5% of the number of particles, for example at least 10%, and preferably less than 50% of the number or less than 30% of the number) having particle sizes greater than the gear faces to bearing faces clearances defined as described in the first aspect.

The apparatus selected for use in the method may have any feature of the apparatus according to the first aspect.

Preferably, the apparatus, for example the first pump, is operated to increase the pressure of the formulation so that the pressure of said formulation at said outlet is at least 10 bar, at least 40 bar or at least 80 bar.

In a first embodiment as described in the first aspect, said first pump may be used to increase the pressure of the fluid formulation by at least 50 bar, suitably at least 70 bar, preferably at least 85 bar, more preferably at least 100 bar. The increase may be less than 200 bar or less than 160 bar. This is referred to as the pressure—increasing pump in the first aspect. The gear pump (herein referred to as the metering pump) may be operated to meter formulation as referred to in the first aspect. The metering pump may be operated so it increases pressure of the fluid formulation by less than 8 bar, 5 bar or 3 bar and, in some cases, provides substantially no increase in pressure.

When said first pump is a pcp, one of either said pcp or gear pump may be used to increase the pressure of the fluid formulation by at least 50 bar, suitably at least 70 bar, preferably at least 85 bar, more preferably at least 100 bar. The increase may be less than 200 bar or less than 160 bar. This is referred to as the pressure—increasing pump in the first aspect. The other of said pcp or gear pump (herein referred to as the metering pump) may be operated to meter formulation as referred to in the first aspect. The metering pump may be operated so it increases pressure of the fluid formulation by less than 8 bar, 5 bar or 3 bar and, in some cases, provides substantially no increase in pressure. In the first embodiment described, the pcp may be used as the pressure—increasing pump. In a second embodiment, the pcp may be used as the metering pump.

In both the first and second embodiments, said formulation is suitably injected into melted polymeric material downstream of the outlet at a pressure of at least 50, 70, 85, 100 or 120 bar. The ratio of the pressure of injection divided by the pressure of said polymeric material may be in the range 0.8 to 1.25, Said formulation is suitably injected at a rate of 1 to 1500 ml/minute, preferably a rate of 3 to 750 ml/minute, more preferably a rate of 10 to 500 ml/minute.

Preferably, after contact between said formulation and said polymeric material, the mixture includes less than 15 wt % (for example less than 10 wt %) of material derived from said formulation and greater than 85 wt % (for example greater than 90 wt %) of melted polymeric material with which the formulation is contacted in the method.

Preferably, formulation is selected and injected at a rate which introduces less than 15 wt %, more preferably less than 10 wt %, or less than 8 wt % of vehicle into the melted polymeric material. That is, after contact between formulation and melted polymeric material, the amount of vehicle in the mixture is preferably less than 15 wt %, less than 10 wt % or less than 8 wt %. Preferably, after contact between formulation and melted polymeric material, the sum of the amounts of all liquids introduced into the polymeric material via said formulation is less than 15 wt %, less than 10 wt % or less than 8 wt %, based on the total weight of mixture comprising said formulation and said melted polymeric material after said contact.

Said polymeric material may be selected from polyesters (especially PET), polycarbonates and polyolefins.

Downstream of contact between said formulation and said polymeric material, the mixture may be used to form sheet or fibre; or other articles in extrusion or blow moulding processes.

The method may include controlling the gear pump, for example the speed thereof, in dependence upon the pressures assessed by first and second pressure sensors, wherein said first pressure sensor is arranged to measure pressure of fluid formulation immediately upstream of the gear pump and the second pressure sensor is arranged to measure pressure of said fluid formulation immediately downstream of said gear pump; and, suitably, pressure information from said first and second sensors is communicated to a processing unit which controls operation of the gear pump.

The method preferably comprises operating the first pump and gear pump independently of one another.

The method preferably includes a user inputting a desired dose rate (or information relating to a desired dose rate) at which the fluid formulation is to be dosed into the melted polymeric material. Information may be input via the user interface of the first aspect.

In the first embodiment (which is equivalent to the first embodiment described in the first aspect), said gear pump may be operated to meter formulation and said first pump (e.g. said diaphragm pump or pcp) may be arranged to increase the pressure of said fluid formulation.

Said processing unit preferably controls operation of the gear pump and first pump as aforesaid according to predetermined parameters input into the unit.

The method of the first embodiment may involve the first pump delivering formulation at the rates described in the first aspect.

In the first embodiment, the method preferably includes maintaining the difference in pressure (ΔP as described in the first aspect) between the inlet and outlet of the gear pump at substantially zero. Thus, ratio of the pressure at the inlet divided by the pressure at the outlet may be maintained substantially in the range 0.95 to 1.05, preferably in the range 0.98 to 1.02.

In the first embodiment, the first pump may be operated so that the difference in pressure between its inlet and its outlet is at least 50 bar, at least 70 bar or at least 90 bar.

In a second embodiment (which is equivalent to the second embodiment described in the first aspect), said pcp may be operated to meter the fluid formulation and said gear pump is arranged to increase the pressure of the fluid formulation.

In the second embodiment, the method may comprise operating the pcp so that the fluid formulation at the outlet of the pcp is at a pressure of less than 5 bar. Said pcp may be operated to deliver greater than 0.1ml/revolution.

In the second embodiment, the method may comprise operating the gear pump so that the pressure of said fluid formulation at the outlet of the gear pump is at least 50 bar, at least 70 bar or at least 90 bar. The method may comprise operating the apparatus so the difference between the pressure at the inlet of the gear pump and the pressure at the outlet of the gear pump is at least 50 bar, preferably at least 70 bar, more preferably at least 90 bar, especially at least 110 bar. In some embodiments, pressures up to 200 bar or up to 400 bar may be used.

Specific embodiment of the invention will now be described, by way of example, with reference to the accompanying drawings, in which:

FIG. 5 is a schematic representation of apparatus used in a trial;

FIG. 9 is a schematic representation of apparatus used in a comparative example;

In the figures, the same or similar parts are annotated with the same reference numerals.

In general terms, high pressure injection apparatus for addition of a liquid formulation into a melt stream comprises a first pump which is arranged to accurately meter the liquid formulation (including highly loaded formulations comprising solids comprising particles of relatively large size) and a second pump which boosts the pressure of the formulation to that of the melt stream into which it is to be injected. In a first embodiment, the first pump is upstream of the second pump and is arranged to build pressure and, the second pump is arranged to meter. In a second embodiment, the first pump is arranged to meter and the second pump is arranged to build pressure.

The apparatus and its functioning will now be described in more detail.

Figure 1:
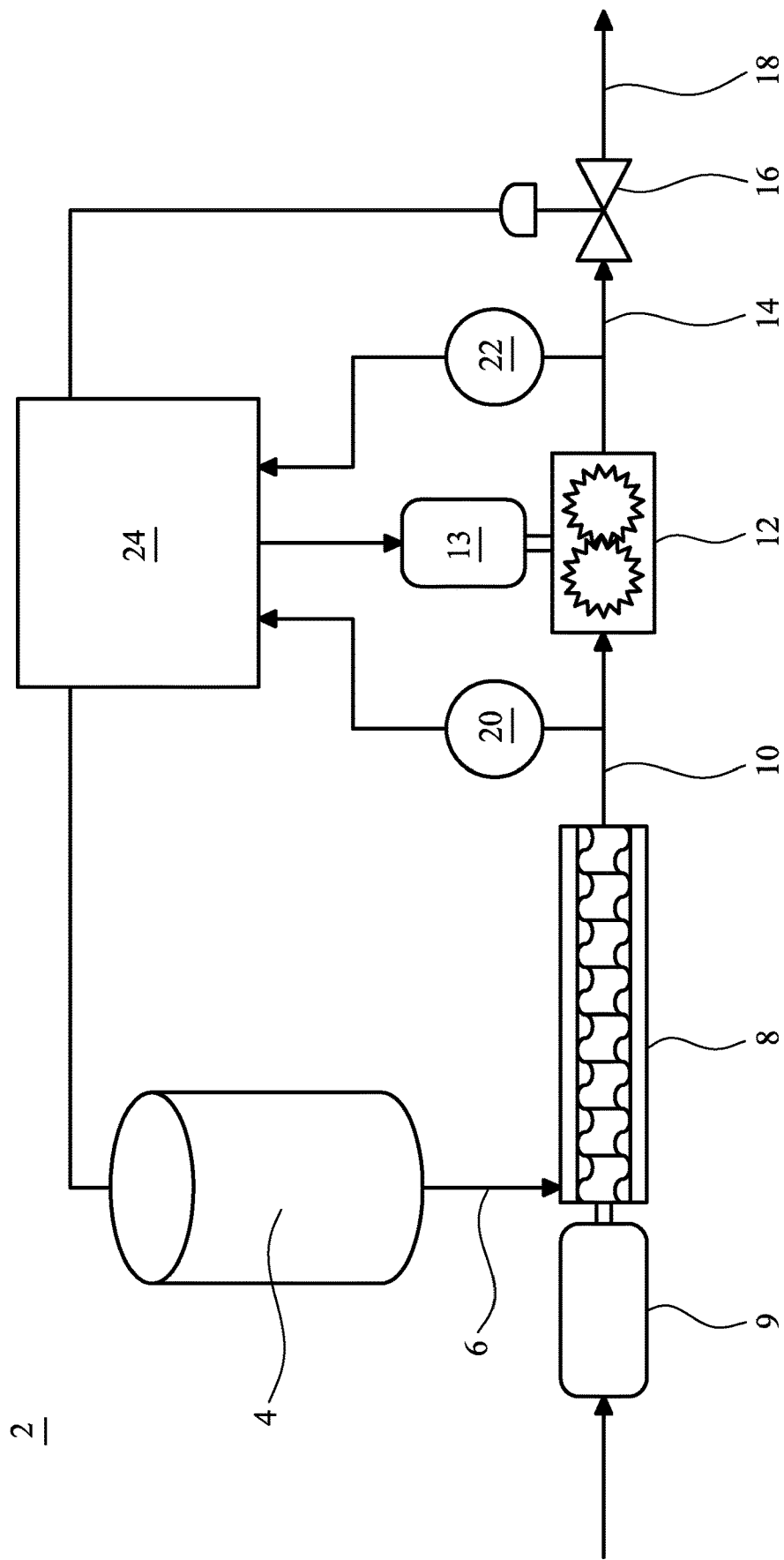
FIG. 1 is a schematic representation of a first embodiment of a high pressure injection apparatus.

A first embodiment of a high pressure injection apparatus is shown in FIG. 1. The apparatus 2 includes a tank 4 for initially receiving liquid formulation. The tank is subjected to ambient temperature and pressure and need not be stirred or otherwise agitated. The tank is arranged to deliver the formulation via pipe 6 into a first pump 8 driven by a motor 9. The pump is suitably arranged to work at a pressure up to 120 bar. Downstream of pump 8, a pipe 10 is arranged to deliver formulation from the pump 8 to a gear pump 12, driven by a motor 13. When said first pump 8 is a progressing cavity pump (pcp), it may be driven by a servo motor 9 with closed loop speed control via an encoder feed back. The pump is suitably arranged to work at a pressure up to 120 bar and operate at 0.28 ml/rev. The rpm is suitably capped at 600 rpm to avoid introducing shear heat into the liquid formulation and the pump.

Since the first pump is arranged to increase pressure, a relatively large first pump may be used. For example, when said first pump is a pcp, it may be arranged to generate 0.28 ml/revolution at a pressure up to 120 bar. The length of such a pcp may include about 30 starts. Alternatively, said first pump may be a multiple diaphragm pump.

Figure 2:
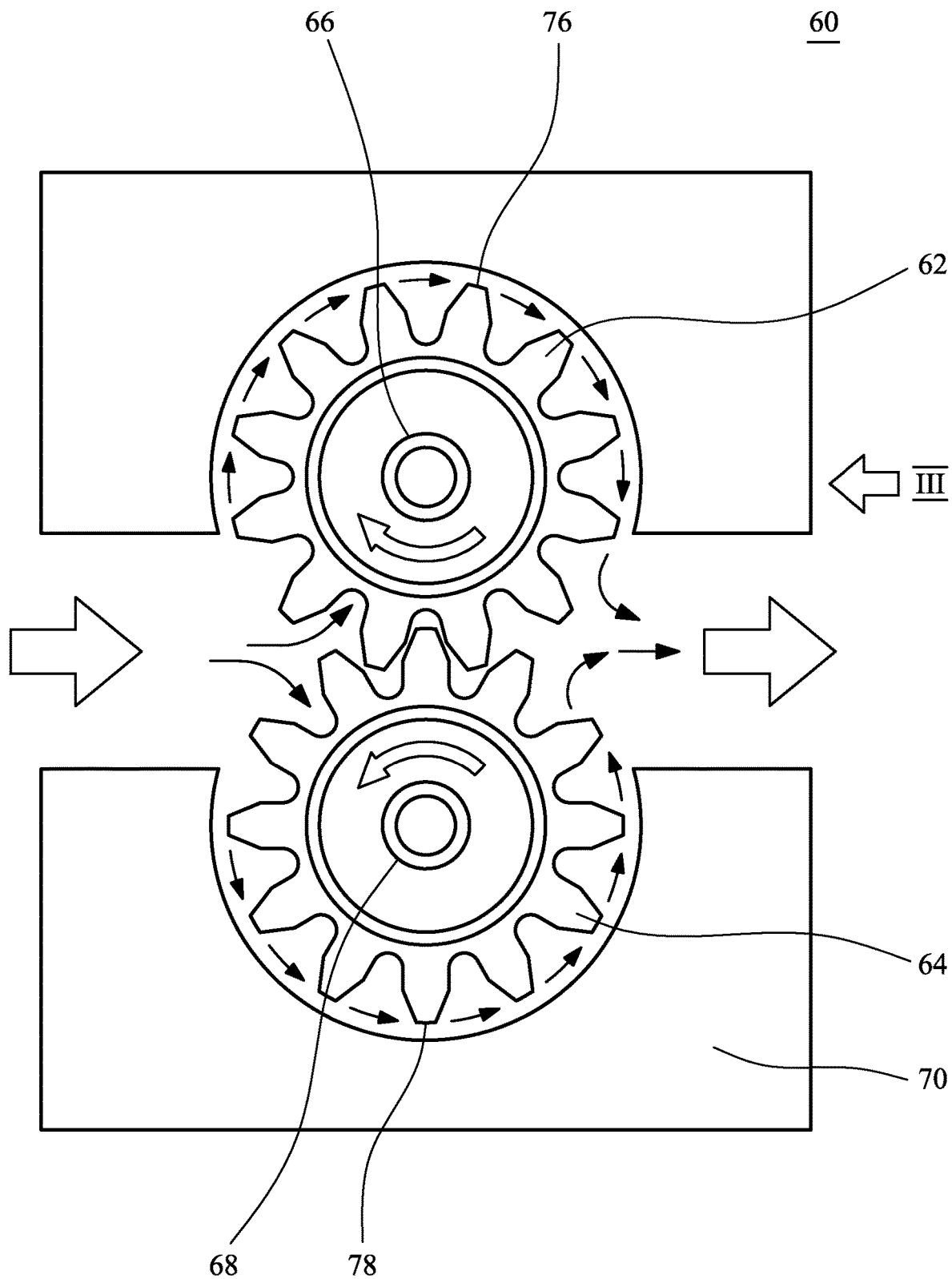
FIG. 2 is a schematic representation of part of a gear pump, in the direction of the axes of the gears.
Figure 3:
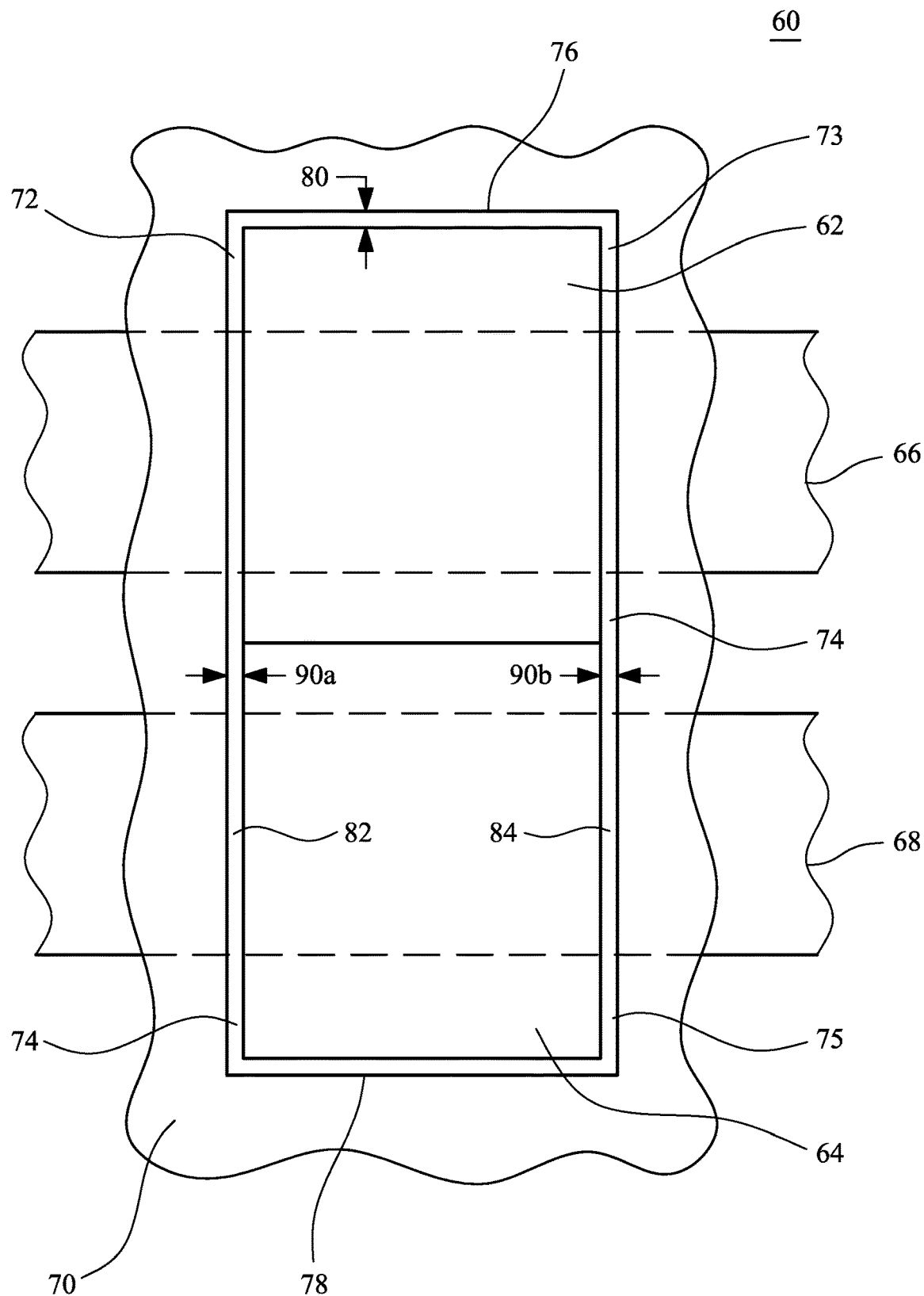
FIG. 3 is a schematic representation of part of the gear pump in the direction of arrow III in FIG. 2 and with the front of the housing cut away.
Figure 4:
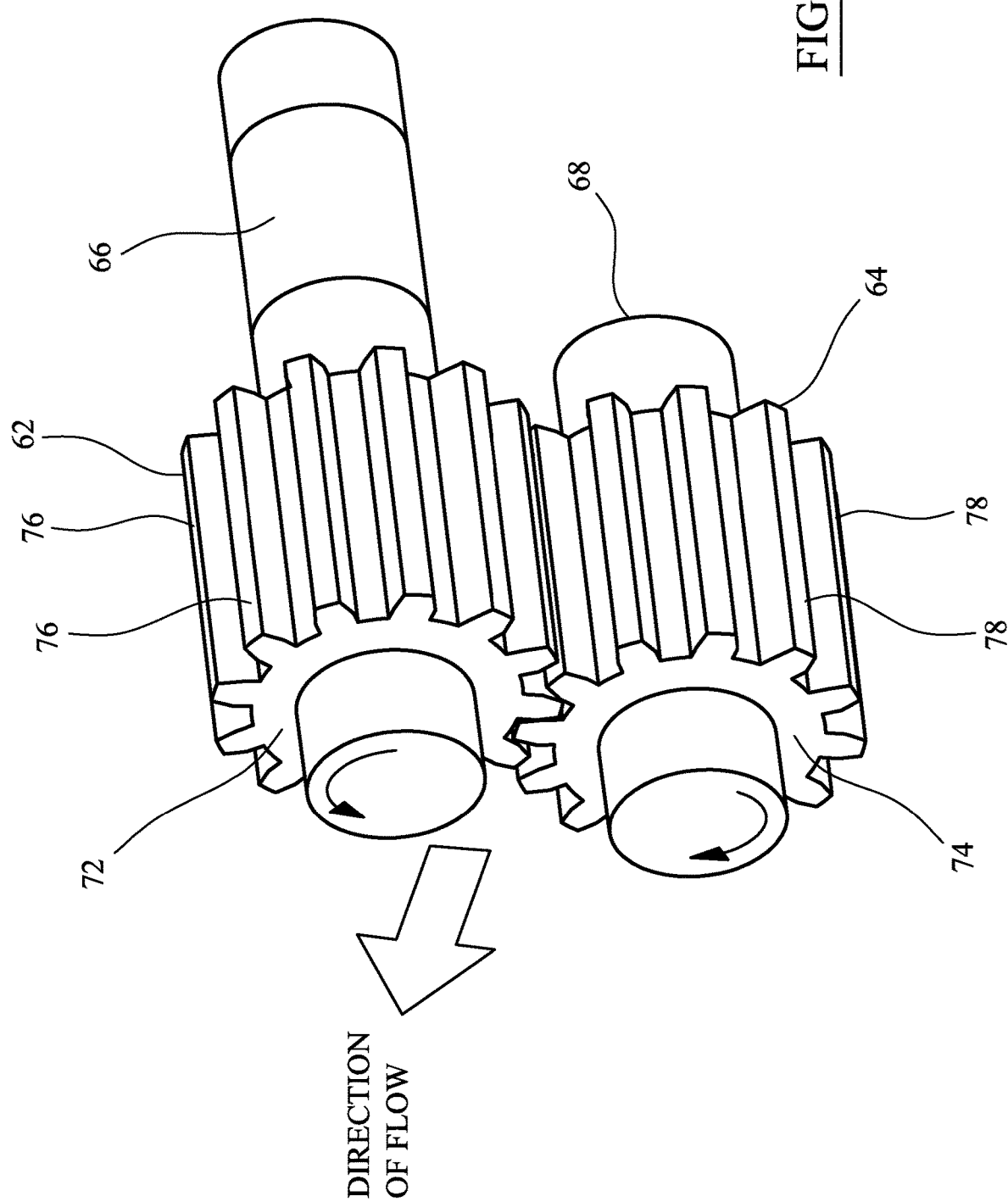
FIG. 4 is a perspective view of the part of the gear pump of FIGS. 2 and 3, with the housing omitted.

Referring to FIGS. 2 to 4, the gear pump 60 is an external gear pump comprising two meshing gears 62, 64 having spur teeth, mounted on respective shafts 66, 68. The gears are arranged within a structure 70 (FIGS. 2 and 3) which comprises parts defined by bearing faces opposite gear faces 72, 73, 74, 75 and parts defined by a housing opposite gear tips 76, 78.

Advantageously, clearances in the gear pump 60 can be wider compared to pumps used in other systems and yet liquid formulation can still be metered accurately using the apparatus. A first clearance which may be wider is referred to as the gear tip—housing clearance. This is the minimum distance between a gear tip of a gear and the adjacent housing measured transverse to the axis of rotation of the gear (i.e. how close the gear tip gets to the adjacent housing). This clearance is represented as distance 80 on FIGS. 2 and 3.

A second clearance which may be wider is referred to as the gear faces—bearing faces clearances. This is the minimum distances between gear faces 72, 73, 74 or 75 of a gear and the adjacent bearing faces 82, 84, measured parallel to the axis of rotation of the gears (i.e. how close the gear faces are to the bearing faces). The second clearance is the sum of the distances 90a and 90b in FIG. 3.

A third clearance is the tolerance between gears and is known as the intermeshing clearance.

The first clearance may be up to 200 µm, the second clearance may be up to 200 µm and the third clearance may also be up to 200 µm.

Downstream of pump 12, a pipe 14 is arranged to deliver formulation to a pneumatically activated injection valve system 16 which controls injection of formulation via pipe 18 into a dynamic mixer and/or a melt stream (not shown) of an extruder.

The apparatus 2 includes a first pressure transducer 20 positioned between the pump 8 and pump 12 and arranged to monitor fluid pressure in pipe 10 at the inlet to pump 12; and a second pressure transducer 22 downstream of pump 12, to monitor fluid pressure in pipe 14.

The apparatus comprises a fully automated PLC controlled close loop system incorporating a control panel 24 which communicates with the components of the apparatus.

The apparatus 2 may be operated as follows:

Colour formulation is introduced into tank 4 and the apparatus 2 is assembled with pipe 18 operatively connected to an inlet of a melt processing apparatus and being arranged to deliver the liquid formulation at suitable pressure into a polymer melt in the melt processing apparatus. The pressure at which the liquid formulation is initially injected may be manually set by an operator via control panel 4. Alternatively, the pressure may be determined via a melt pressure transducer next to the injection point and information fed back to the control panel 4 which may then control relevant process parameters.

Prior to operation of the apparatus, the desired throughput of the melt processing apparatus and the ratio in % of the liquid formulation to be introduced into the polymer (i.e. the "let-down-ratio" (LDR)) are determined and information manually input into the apparatus via the control panel. The PLC then calculates the appropriate speed of the gear pump to maintain the correct dosage rate. A 0-10V analogue input is taken from the extruder associated with the dynamic mixer and/or melt stream into which formulation is to be delivered and compared to the manually input LDR. If there is a variation in the voltage, the metered volume of liquid formulation is automatically adjusted to keep the LDR constant.

Motors 9, 13 are operated to drive pumps 8 and 12 so that liquid formulation passes from tank 4, via pipe 6, pump 8, pipe 10, pump 12 and pipe 14 to the injector valve system 16 which will initially be closed, but may open automatically when a predetermined pressure is reached. The first pump 8 is arranged to build pressure of liquid formulation to be delivered via pipe 18 into the melt processing apparatus. The pressure at its inlet will be determined by the static head of liquid in the tank 4. Advantageously, the reservoir does not need to be pressurized which would generally be the case if pump 8 was a gear pump. A first pump is more readily able to pull liquid from tank 4 compared to a gear pump, Furthermore, it is found that the first pump can readily build pressure up to about 120 bar and operate at such high pressure over a long period, even when the liquid formulation is highly loaded with large particulates.

The gear pump 12 is not arranged to increase pressure of the liquid formulation but is arranged solely to meter the formulation so that predetermined quantities of the formulation, accurately metered by the gear pump, can be injected into the melt stream at the pressure built by the first pump which will be at substantially the same pressure as the melt stream. Since the pressure across the gear pump is substantially zero, there is no tendency for backflow of the formulations in the pump, thereby facilitating accurate metering of formulation using the gear pump.

In use, the control panel 24 receives feedback which enables the apparatus to be controlled. For example, it monitors the pressure determined by pressure transducers 20, 22;

it controls the first pump so that the generation of pressure by the first pump is constant and the appropriate formulation pressure is achieved in pipe 18 for injection into a dynamic mixer and/or a melt stream; it ensures that the pressures in pipes 10, 14 are the same so the ΔP between the inlet and outlet is substantially zero; and it controls the gear pump so it meters a predetermined amount of the formulation.

Advantageously, the apparatus 2 is found to be able to accurately dose into the melt processing apparatus at a desired high pressure. The first pump is readily able to increase pressure of the formulation to 120 bar as may be required. Also, since the gear pump 12 is used only for metering and the pressure across it is zero it can meter relatively accurately (even though clearances between the gears and other parts of the pump are relatively wide) and, in particularly, the accuracy is greater compared to if such a gear pump was used to both increase pressure and meter, especially when formulations which have high viscosity and/or carry large particles are involved.

Over a prolonged period, wear in the gear pump may cause the volume/revolution delivered to decrease. This can be addressed by periodic calibration of the pump.

Examples 1 to 4 illustrate use of the apparatus of the first and second embodiments using a pcp. Example 5 is a comparative example. Example 6 illustrates operation of the apparatus of the first embodiment, using a diaphragm pump.

Example 1

Operation of Apparatus of Second Embodiment Incorporating a PCP

Referring to FIG. 5, formulation to be tested was provided in tank 4. A standard Netzsch NX510/008 progressing cavity pump 40 (delivering 0.9 ml/rev) was controlled via a controller set at 60 rpm and arranged to feed formulation, at a metered rate, from tank 4 into the inlet port of the MVV gear pump 42. There was a pressure transducer 44 just prior to the inlet of the gear pump to measure the pressure in the link pipe 46. After the gear pump 42 was a pressure sensor 48, purely to read the post pump line pressure and a pressure regulator 51 to adjust the post gear pump pressure. The gear pump 42 was driven by a servo motor which was governed by the pressure in the link pipe between the two pumps. The link pipe pressure was set at 5 Bar and the gear pump speed was controlled via a programmable logic controller to keep the pressure in the pipe 46 constant. This control involved increasing or decreasing the speed of the gear pump to correct for the effects of slippage and therefore keep the output in line 50 constant.

The following formulations were assessed

| Formulation Code | Formulation Colour | Type of particles | Particle sizes | Viscosity (cP) | Solids Loading |
|---|---|---|---|---|---|
| A | Yellow | Pigment | Particles up to 70 μm. | 17100 | 50 |
| B | Black | Pigment | Particles up to 10 μm. | 34000 | 40 |

Figure 6:
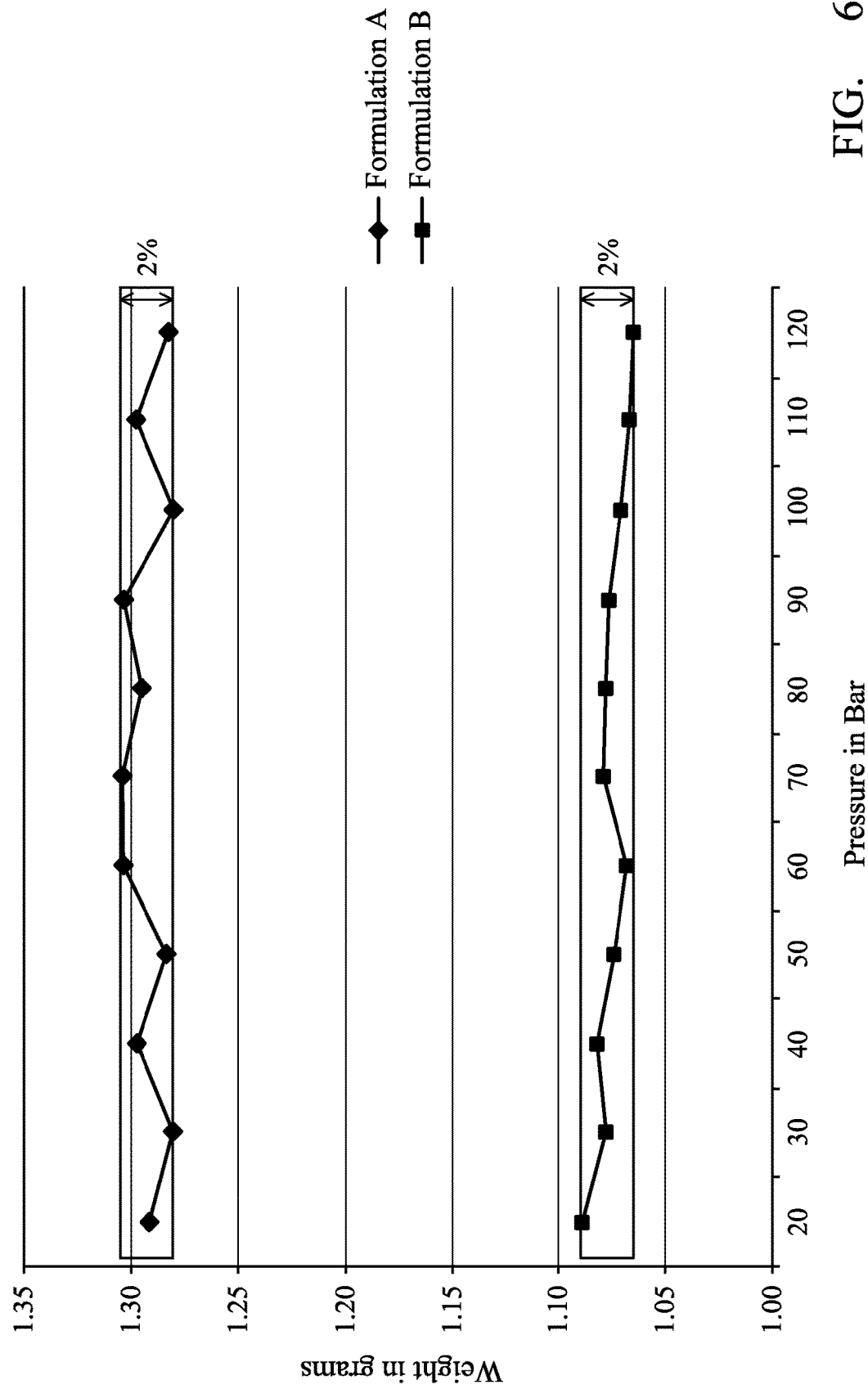
FIG. 6 is a graph of output per revolution v. pressure in bars for two test formulations.

Respective samples of fluids were collected manually over periods of 60 seconds after the pressure regulator 51 for a series of different pressures measured downstream of gear pump 42. Results are provided in FIG. 6. Referring to FIG. 6, it will be noted for formulation B that the weights of formulation collected at different pressures (between 20 to 120 bar) over 60 second periods varies only by 2%. Similarly, for formulation A, which was delivered at a higher rate than formulation B, the weights collected vary only by 2%.

It is clear from the results that the arrangement using the pcp to meter and the gear pump to build pressure works well to give an accurate metered output, over a range of pressures. In practice, it is found that the gear pump speed has to increase to counteract slip and this is more apparent the lower the viscosity of the formulation. Nonetheless, the apparatus can be used to dose a wide range of formulation types (e.g. in terms of viscosity and/or levels of particulates) into melt processing apparatus in an efficient manner.

Example 2

Operation of Apparatus of First Embodiment using a PCP

Figure 7:
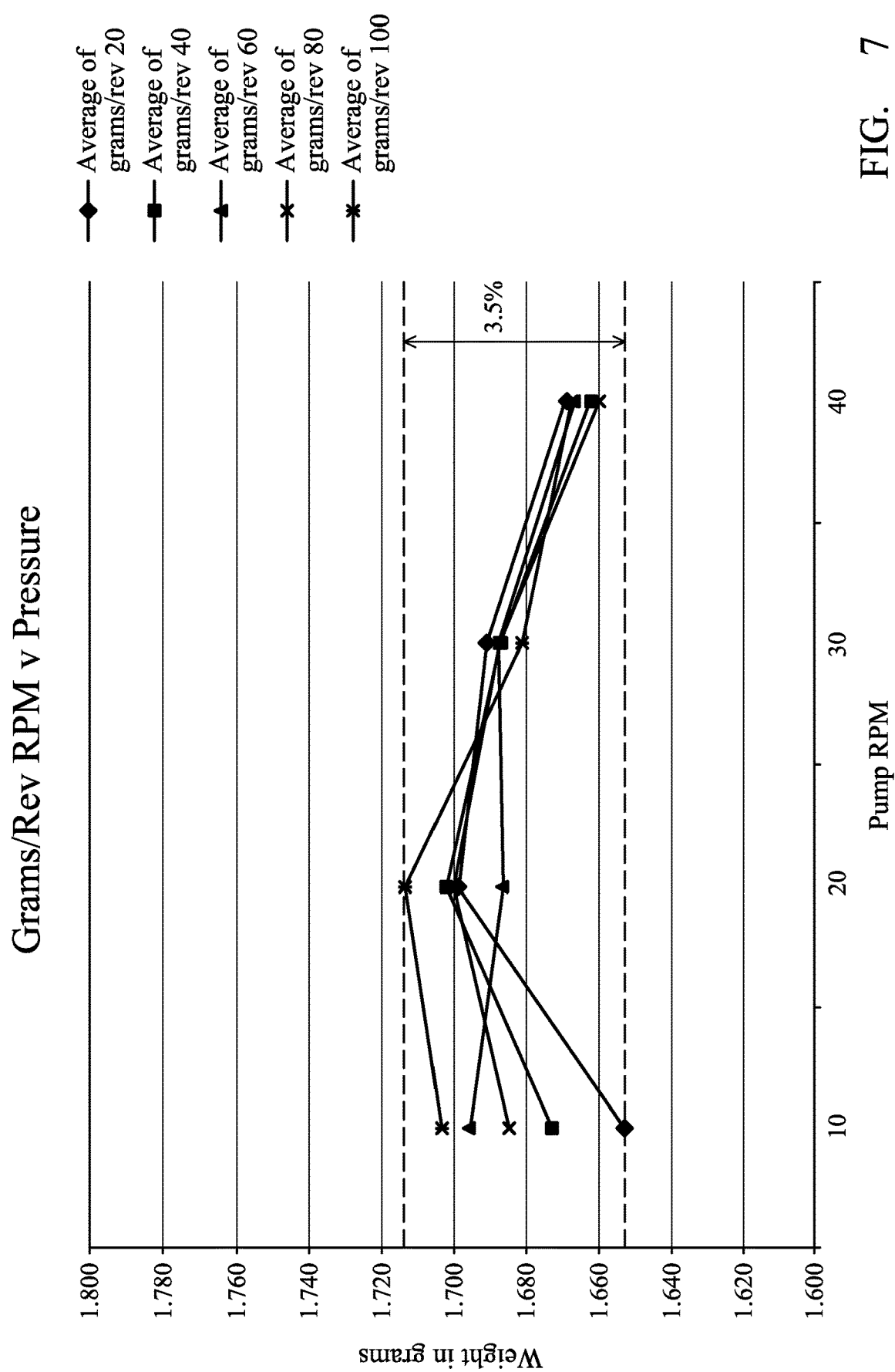
FIG. 7 is a graph of grams/rev (rpm) v. pressure.
Figure 8:
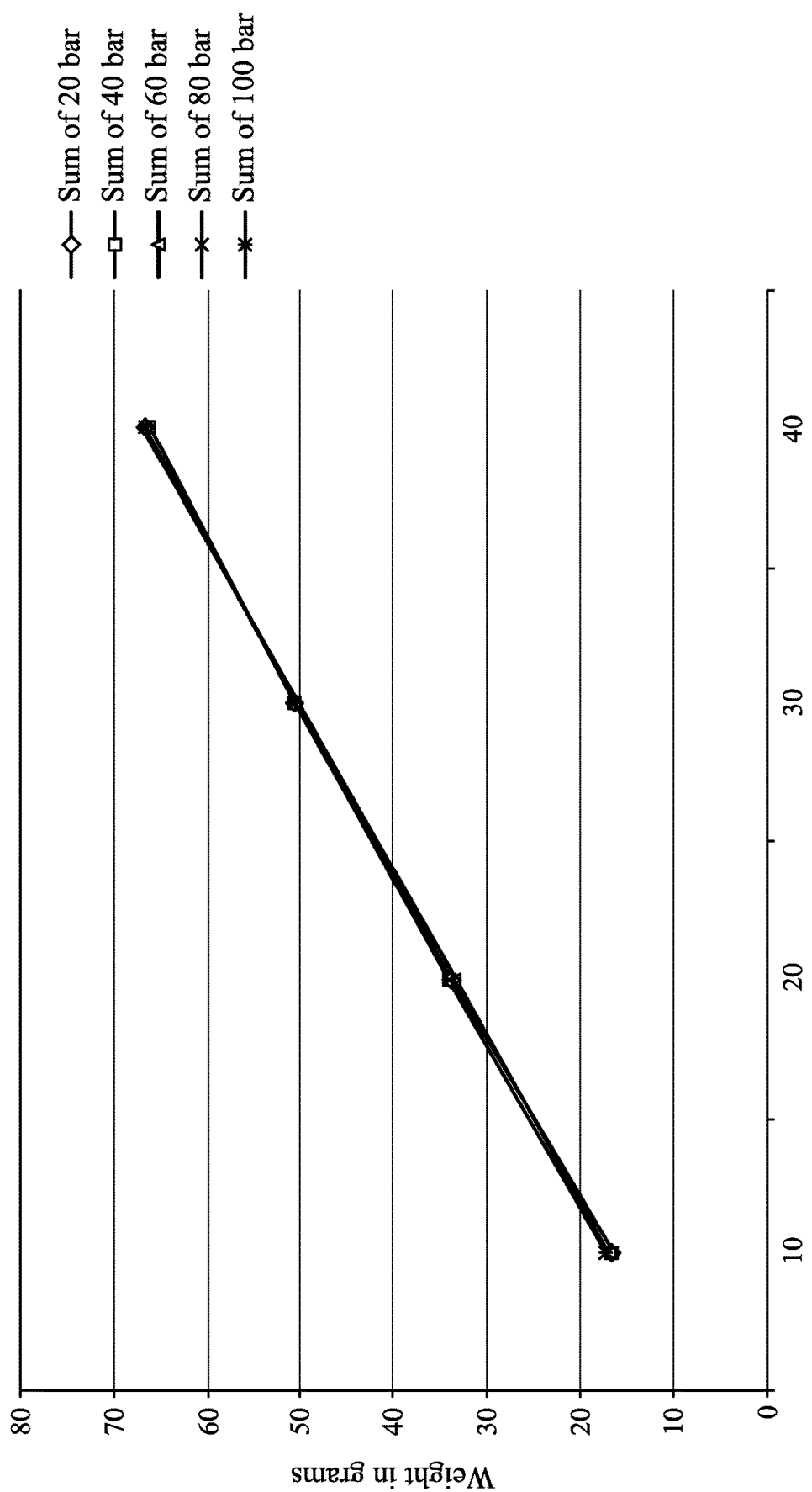
FIG. 8 is a graph of pump displacement RPM v. pressure.

The apparatus of the first embodiment was used to deliver a formulation (formulation A) over a series of pressures as described in Example 1 except that the pcp was used to control pressure and the gear pump used for metering as described in the first embodiment. Results are provided in FIGS. 7 and 8. It is found, in general, that the fluid displacement per revolution is substantially the same irrespective of the pressure.

Example 3

Operation of an Apparatus of Second Embodiment using a PCP

The procedure described generally in Example 1 was followed except the controller was set at 10, 50, 100 or 150 rpm. The formulation assessed was as follows:

| Formulation code | Formulation colour | Type of particles | Particle size | Viscosity (cp) | Solids loading wt % |
|---|---|---|---|---|---|
| C | Red | Pigment | Particles up to 10 μm | 6600 @ 40° C. | 75 |

Respective samples of fluids were collected after the pressure regulator 51 for a series of different pressures measured downstream of gear pump 42 at progressing cavity pump (40) rpms of 10, 50, 100 or 150 rpm. It was found that the weights of formulations collected at different pressures (between 20 to 120 bar) varied by less than 2%.

Example 4

Operation of Apparatus of Second Embodiment using a PCP

The procedure described in Example 1 was followed except the controller was set at 125 rpm. The following formulation was assessed:

| Formulation code | Formulation colour | Type of particles | Particle size | Viscosity (cp) | Solids loading wt % |
|---|---|---|---|---|---|
| D | Blue | Pigment | Particles up to 10 μm | 6800 @ 35° C. | 44 |

Respective samples of fluids were collected over 60 second periods after pressure regulator 51 for a series of different pressures (between 20 to 200 bar) measured downstream of gear pump 42. It was found that the weight of formulation collected in each case varied by only 2%.

Example 5 (Comparative)

Operation of Progressive Cavity Pump with No Gear Pump (i.e. Progressing Cavity Pump used to Meter and Build Pressure)

Referring to FIG. 9, formulation D to be tested was provided in tank 4. A standard Netzsch low volume progressing cavity pump 40 (delivering 0.28 ml/rev) was controlled via a controller set at 200 rpm and arranged to feed formulation, at a metered rate, from tank 4 into the output in line 50. After the progressing cavity pump 40 was a pressure sensor 48.

Figure 10:
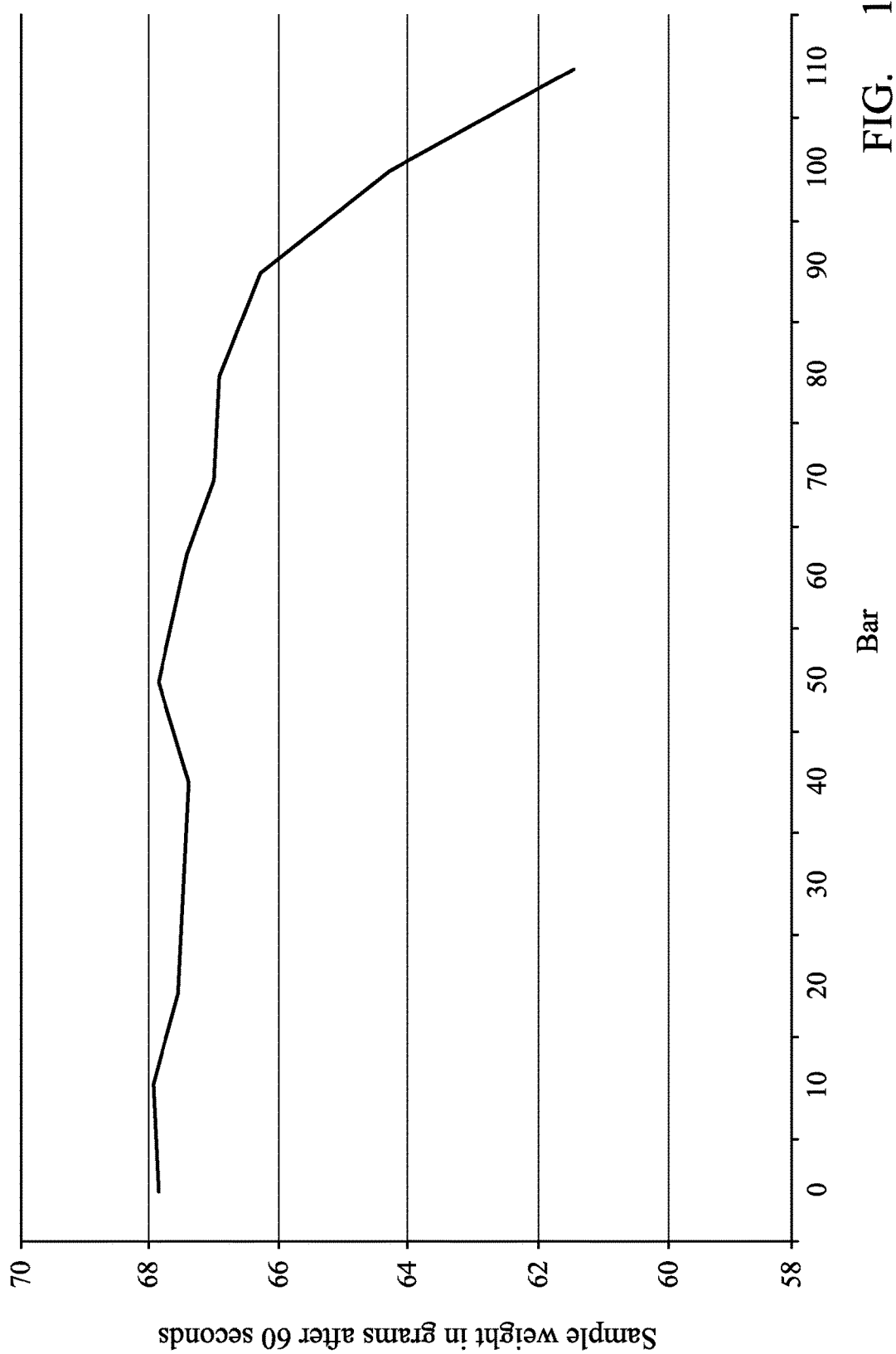
FIG. 10 is a graph detailing results from use of the apparatus of FIG. 9.

Respective samples of fluids were collected manually over periods of 60 seconds after the pressure regulator 51 for a series of different pressures measured downstream of progressing cavity pump 40. Results are represented in FIG. 10 from which it will be noted that the weights of formulation collected at different pressures (between 0 to 110 bar) over 60 second periods starts to reduce rapidly above pressures of 80 bar. It is clear from the results that using a progressive cavity pump to meter and build pressure does not give accurate metered output above 80 bar.

Although the apparatus of the first and second embodiments has been described using an external gear pump, other types of gear pumps may be used. Nonetheless, an external gear pump as described is preferred since it is of low cost and is not complex meaning it can be easily cleaned. In addition, in view of its low cost, separate gear pumps and associated pipework may be provided for each colour or formulation which is to be delivered using the apparatus described. In this case, it will not be necessary to clean a gear pump and associated pipework between uses of the apparatus to deliver different colours and/or formulations—e.g. one gear pump and associated pipework which has been used for one colour may be replaced with another gear pump and associated pipework which is to be used to deliver another colour. Thus, a number of gear pumps and associated pipework which have been (or are to be) used to deliver different colours may be stored in uncleaned states until needed for use.

In the first embodiment using a pcp, the pcp builds pressure and, accordingly, may be relatively costly. Consequently it may not be commercially acceptable to provide dedicated pcps for each colour and/or formulation it may be desired to deliver using the apparatus. However, in the second embodiment where the pcp does not need to generate high pressure, a relatively cheap pcp may be used, thereby making it commercially viable to provide dedicated pcps for each colour/formulation to be delivered using the apparatus. In fact, in the apparatus of the second embodiment, it may be commercially viable to provide dedicated kits comprising all parts of the apparatus which contact the formulation in use.

Each kit may comprise a tank 4, pcp 8, gear pump 12 and associated pipework. Using such kits will enable the time required to change the colour and/or formulation to be dispensed using the apparatus to be significantly reduced, since minimal or no cleaning may be required between runs involving different colours and/or formulations.

The apparatus described may be arranged to deliver formulation at a rate of from 1 ml/minute to 1500 ml/minute.

It will be appreciated that different formulations may be dosed into polymeric materials at different rates and levels. To cover the typical range of levels, suitable pcps may be selected from four different pumps as follows:
  (i) Low volume—pumps 0.28 ml/rev at speeds up to 200 rpm;
  (ii) Medium volume—pumps 0.9 ml/rev at speeds up to 200 rpm;
  (iii) High volume—pumps 2.8 ml/rev at speeds up to 200 rpm;
  (iv) Highest volume—pumps >8 ml/rev at speeds up to 200 rpm.

It is preferred that such pumps are operated at less than their maximum to preserve pump life. Operation at about 100 rpm is preferred.

Gear pumps may be selected from:
  (i) pump delivering 0.1 cc/rev with a 10-150 rpm range;
  (ii) pump delivering 1 cc/rev with a 10-150 rpm range;
  (ii) pump delivering 5 cc/rev with a 10-150 rpm range.

The apparatus described may be able to accurately dose formulations having viscosity in the range 5000-35000 cp, at the operating temperature of the formulation containing particles (e.g. pigments) having particle sizes up to 100 µm, with loadings of the particles up to 85 wt % (e.g. in the case of inorganic pigments) or up to 65 wt % (e.g. in the case of organic pigments and dyes).

Example 6

Operation of Apparatus of First Embodiment, using a Multiple Diaphragm Pump and Gear Pump Referring to FIG. 1, formulation A to be tested was provided in tank 4. A standard Hydracell P300 multiple diaphragm pump 9 was controlled via a controller to ensure that a constant and appropriate formulation pressure (0 to 200 bar) is achieved in pipe 18. The MVV (0.6 cc/rev) gear pump (12) is controlled so that it is set at 50 rpm and arranged to feed formulation, at a metered rate, through the pressure regulator 16.

Figure 11:
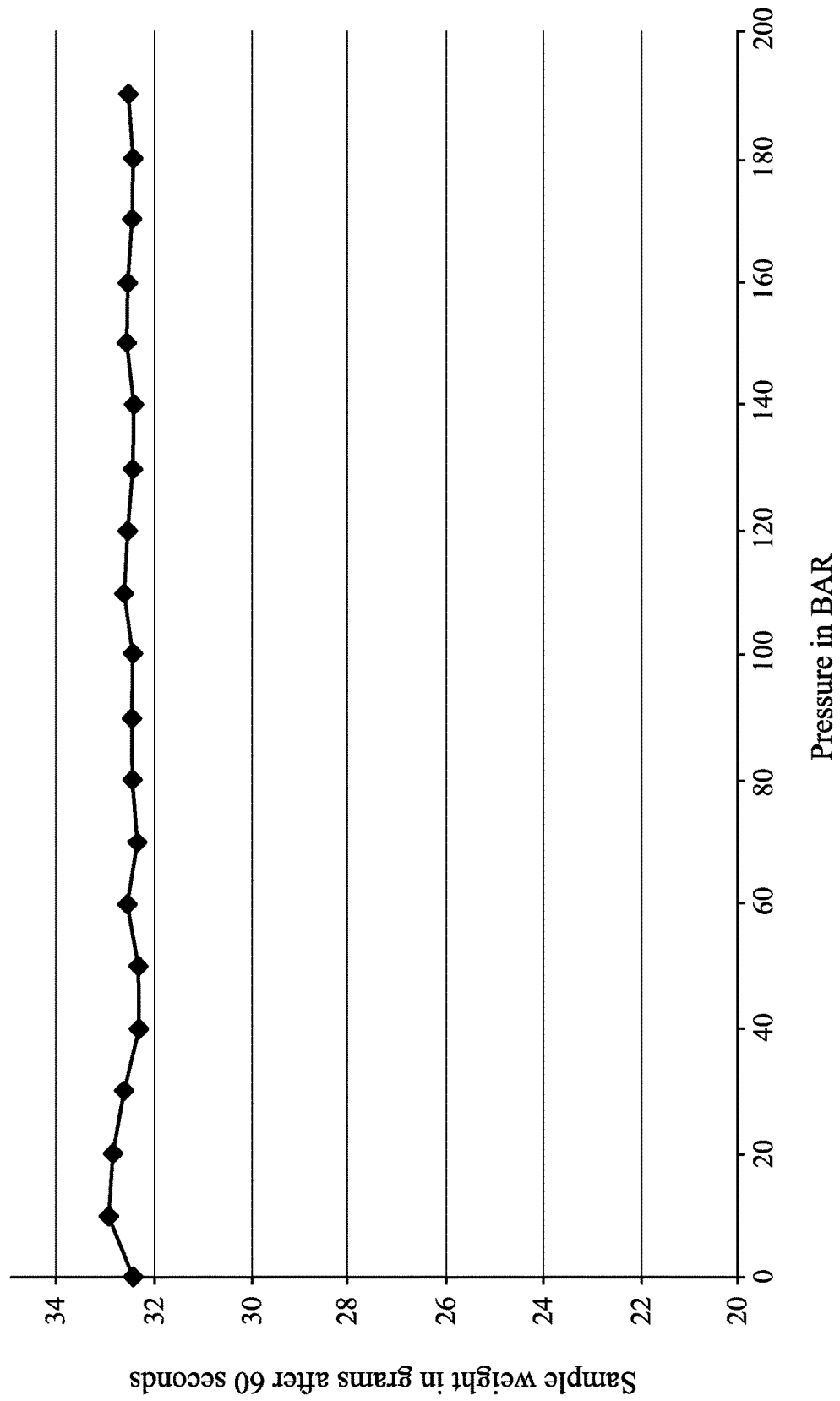
FIG. 11 is a graph detailing results achieved using a multiple diaphragm pump.

Respective samples of fluids were collected manually over periods of 60 seconds after the pressure regulator 22 for a series of different pressures measured downstream of gear pump 12. Results are provided in FIG. 11. Referring to FIG. 11, it will be noted for formulation A that the weights of formulation collected at different pressures (between 20 to 200 bar) over 60 second periods varies only by 2%.

It is clear from the results that the arrangement using the multiple diaphragm pump to build pressure and gear pump to meter works well to give an accurate metered output, over a range of pressures. The apparatus can be used to dose a wide range of formulation types (e.g. in terms of viscosity and/or levels of particulates) into melt processing apparatus in an efficient manner.

Said first embodiment may use a first pump selected from a pcp or diaphragm pump as described.

A second embodiment of high pressure injection apparatus may use apparatus which is schematically the same as the FIG. 1 embodiment. However, in the second embodiment, a pcp (rather than a diaphragm pump) may be used. In this case, the pcp 8 is arranged to increase pressure only to about 3 bar with its primary function being to accurately meter the formulation. The gear pump 12 is the primary pump which is arranged to increase pressure of the formulation. In this case, the pcp may be arranged to generate up to 3 bar and pump up to 10 ml/revolution. Such pcps are relatively small (e.g. having up to 6, or up to 3, starts) and are of relatively low cost. Furthermore, since the pcp does not need to generate high pressure, the internal geometries can be relatively large, facilitating the handling of formulations which include larger particulates.

The gear pump used in the second embodiment may be the same as that used in the first embodiment.

In the second embodiment, the apparatus may be operated as follows. Motors 9 and 13 are operated to drive the pumps so liquid formulation flows from tank 4 to the injector valve system 16 as in the first embodiment. However, in the second embodiment, the pcp 8 is arranged to meter the formulation at a predetermined rate under the control of control panel 24. The pcp is readily able to accurately meter the formulation notwithstanding that it may have relatively high viscosity and carry relatively large particulate matter. In operation, the pressures at the outlet of the pcp may be 3 bar (i.e. sufficient pressure to produce a satisfactory flow through the pcp but not so high that the ability of the gear pump to meter may be compromised) during operation of the apparatus. On exiting the pcp, the formulation enters the gear pump 12 (at a pressure of 3 bar). The gear pump is used simply to boost pressure of the liquid to that required for injection into the melt stream. The pressure is monitored by pressure transducers 20, 22 and the ΔP between the inlet and outlet of the gear pump controlled so that a predetermined pressure is achieved at the pipe 14 and downstream thereof.

If there is any slippage in the gear pump, fluid will flow back into the pipe 10 between the pcp and gear pump and cause the pressure in the pipe to rise. In this case, the PLC will increase the gear pump speed to compensate until the inlet pressure to the gear pump returns to 3 bar, thereby to counteract any slippage.

The gear pump tolerances in the second embodiment can be relatively wide and dosing accuracy should not alter as the gear pump wears through use because metering is undertaken by the pcp.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system comprising a combination of an apparatus for processing a melted polymeric material and an apparatus for injecting a fluid formulation into the melted polymeric material, the apparatus for injecting a fluid formulation comprising a first pump and a gear pump arranged in series in a fluid path between a reservoir for the fluid formulation to be injected and an outlet of the apparatus for injecting a fluid formulation;
   wherein said first pump is a progressing cavity pump;
   wherein said gear pump is not a progressing cavity pump; and
   wherein the reservoir has a volume in the range of 1 to 1000 litres;
   wherein said outlet of the apparatus for injecting a fluid formulation is in fluid communication with an inlet of the apparatus for processing a melted polymeric material via which the fluid formulation can be introduced into a melt stream of the melted polymeric material disposed in the apparatus for processing a melted polymeric material,
   wherein said apparatus for processing a melted polymeric material is an extruder.

2. System according, to claim 1, wherein the reservoir is arranged to deliver the fluid formulation to the inlet of the first pump at a pressure of less than 100 millibar.

3. System according to claim 1, wherein said gear pump includes a gear having gear teeth which include gear tips, wherein the minimum distance between the gear tips and an adjacent housing is at least 0.005 mm and is less than 0.200 mm; and/or said gear pump includes a gear, wherein the sum of the minimum distances between gear faces and adjacent bearing faces measured parallel to the axis of rotation of the gear is at least 0,005 mm and is less than 0.200 mm; and/or an intermeshing clearance between intermeshing ears is at least 0.005 mm.

4. System according to claim 1, wherein said apparatus for injecting a fluid formulation includes a first pressure sensor upstream of the gear pump and a second pressure sensor downstream of the gear pump wherein the apparatus for injecting a fluid formulation is arranged to control said gear pump in dependence upon the pressures assessed by said first and second pressure sensors.

5. System according to claim 1, wherein a processing unit of said apparatus for injecting a fluid formulation is arranged to operate one of either the first pump or gear pump so that the pressure difference between the inlet and outlet of the selected one of either the first pump or gear pump is less than 8 bar; and said processing, unit of said apparatus for injecting a fluid formulation is arranged to operate the other one of either the first pump or gear pump to increase pressure of the fluid formulation to greater than 50 bar.

6. System according to claim 1, wherein a processing unit of the apparatus for injecting a fluid formulation is programmed to operate the gear pump and first pump so the gear pump is operable to meter the fluid formulation and said first pump is arranged to increase the pressure of the fluid formulation; wherein said first pump is arranged to increase the pressure of the fluid formation to at least 60 bar and the processing unit is programmed to maintain the ΔP between the inlet and outlet of the gear pump at less than 3 bar.

7. System according to claim 1, wherein said progressing cavity pump includes at least 10 stages.

8. System according to claim 1, wherein a processing unit of the apparatus for injecting a fluid formulation is programmed to operate the progressing cavity pump to meter the fluid formulation and said gear pump to increase the pressure of the fluid formulation.

9. System according to claim 1, wherein said progressing cavity pump is arranged only to generate up to 5 bar; and/or it includes 10 stages or fewer.

10. System according to claim 1, wherein:
   said first pump is a progressing cavity pump;
   the reservoir is arranged to deliver the fluid formulation to the inlet of he first pump at a pressure of less than 100 millibar; and
   a processing unit of said apparatus for injecting a fluid formulation is arranged to operate one of either the first pump or gear pump so that the pressure difference between the inlet and outlet of the selected one of either the first pump or gear pump is less than 8 bar; and said processing unit of said apparatus for injecting a fluid formulation is arranged to operate the other one of either the first pump or gear pump to increase pressure of the fluid formulation to greater than 50 bar.

11. System according to claim 10, wherein said apparatus for processing a melted polymeric material contains melted polymeric material and the fluid formulation is one of a colorant, a stabilizer, a delusterant, an anti-static agent, and an optical brightener.

12. An apparatus for injecting a fluid formulation into a melted polymeric material, the apparatus comprising the combination of a device for injecting a fluid formulation and a melt processing device which is an extruder, the device for injecting a fluid formulation including a progressing cavity pump and a gear pump arranged in sequence in a fluid path between a reservoir for the fluid formulation to be injected and an outlet of the apparatus, wherein said gear pump includes two meshing gears, wherein said device for injecting a fluid formulation is provided in combination with a melt processing device to define an assembly wherein an outlet of the apparatus for injecting is in fluid communication with an inlet via which fluid formulation can be introduced into a melt stream produced by said melt processing device, wherein said reservoir contains the fluid formulation to be injected, and wherein said, fluid formulation includes at least 20 wt % solids comprising particulate material in the form of solid pigments andior dyes.

13. The apparatus of claim 12, further comprising; a first pressure sensor located upstream of the gear pump and arranged to measure a gear pump inlet pressure; a second pressure sensor located downstream of the gear pump and arranged to measure a gear pump outlet pressure; a processing unit arranged to receive information from the first pressure sensor and the second pressure sensor; and
   a control panel configured to control the gear pump to meter a predetermined amount of the fluid formulation.

14. Apparatus for injecting a fluid formulation into a melted polymeric material, the apparatus comprising an apparatus for injecting a fluid formulation including a first pump and a gear pump arranged in series in a fluid path between a reservoir for the fluid formulation to be injected and an outlet of the apparatus for injecting a fluid formulation;
   wherein said first pump is a progressing cavity pump;
   wherein said gear pump is not a progressing cavity pump;
   wherein said gear pump is an external gear pump;
   wherein the reservoir has a volume in the range of 1 to 1000 litres;
   wherein said apparatus for injecting a fluid formulation is provided in combination with a melt processing apparatus to define a system wherein an outlet of the apparatus for injecting a fluid formulation is in fluid communication with an inlet of the melt processing apparatus via which fluid formulation can be introduced into a melt stream produced by said melt processing apparatus;
   wherein pressure monitoring means is provided for monitoring the pressure of the melt stream, wherein information relating to said pressure is communicated to a processing unit of said apparatus for injecting a fluid formulation; and wherein said melt processing apparatus is an extruder.

15. System according to claim 1, wherein the first pump and the gear pump are independently operable.

16. System according to claim 1, wherein between said reservoir and said outlet of the apparatus for injecting a fluid formulation via which outlet the fluid formulation can be delivered into the melt stream produced by said apparatus for processing a melted polymeric material, said apparatus for injecting, a fluid formulation includes only two pumps, wherein said two pumps comprise said progressing cavity pump and said gear pump.

17. System according to claim 1, wherein pressure monitoring means is provided for monitoring the pressure of the melt stream, wherein information relating to said pressure is communicated to a processing unit of said apparatus for injecting a fluid formulation; wherein the apparatus for injecting a fluid formulation is arranged to adjust the pressure at which fluid formulation is injected into the melt stream in dependence upon the pressure of said melt stream as assessed by said pressure monitoring means.

18. System according to claim 1, including a user interface by means of which a user, can input process information selected from one or more of melt processing apparatus throughput and LDR (Let-Down-Ratio).

19. System according to claim 1, wherein said apparatus for processing a melted polymeric material contains melted polymeric material which is PET and the fluid formulation is one of a colorant, a stabilizer, a delusterant, an anti-static agent, and an optical brightener.

20. System according to claim 12, wherein said extruder contains melted polymeric material which is PET.

* * * * *